United States Patent
Atia et al.

(10) Patent No.: US 10,331,371 B2
(45) Date of Patent: Jun. 25, 2019

(54) DETERMINING MAXIMUM VOLUME SIZE

(71) Applicant: INTERNATIONAL BUSINESS MACHINES CORPORATION, Armonk, NY (US)

(72) Inventors: Ohad Atia, Haifa (IL); Amalia Avraham, Petach Tikva (IL); Ran Harel, Kfar-Saba (IL); Alon Marx, Matan (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/050,543

(22) Filed: Feb. 23, 2016

(65) Prior Publication Data

US 2017/0242610 A1 Aug. 24, 2017

(51) Int. Cl.
*G06F 3/00* (2006.01)
*G06F 3/06* (2006.01)

(52) U.S. Cl.
CPC ............ *G06F 3/0644* (2013.01); *G06F 3/064* (2013.01); *G06F 3/0604* (2013.01); *G06F 3/0605* (2013.01); *G06F 3/067* (2013.01); *G06F 3/0631* (2013.01); *G06F 3/0683* (2013.01); *G06F 3/0689* (2013.01)

(58) Field of Classification Search
None
See application file for complete search history.

(56) References Cited

U.S. PATENT DOCUMENTS

| | | |
|---|---|---|
| 8,566,546 B1 | 10/2013 | Marshak et al. |
| 8,793,463 B2 | 7/2014 | Moss et al. |
| 8,826,293 B2 | 9/2014 | Jaquet et al. |
| 8,909,890 B2 | 12/2014 | Gill et al. |
| 9,053,002 B2 | 6/2015 | Goodman et al. |
| 9,098,201 B2 | 8/2015 | Benjamin et al. |
| 9,112,890 B1 | 8/2015 | Ori |
| 2008/0201535 A1 | 8/2008 | Hara |
| 2014/0052908 A1* | 2/2014 | Govande ............... G06F 3/0673 711/112 |
| 2016/0342357 A1* | 11/2016 | Ramamoorthy .... G06F 12/0868 |
| 2016/0371145 A1* | 12/2016 | Akutsu ................. G06F 3/0619 |

* cited by examiner

*Primary Examiner* — Midys Rojas
(74) *Attorney, Agent, or Firm* — Griffiths & Seaton PLLC

(57) ABSTRACT

Methods, computing systems and computer program products implement embodiments of the present invention that include receiving a request including a specified number of logical volumes, and identifying, in a storage system including multiple storage pools having storage space, respective first amounts of the storage space that are available in the multiple storage pools. Based on the specified number of logical volumes and the first amounts of the storage space, a set of volume sizes indicating second amounts of the storage space are defined, and a given volume size indicating a maximum size for the specified number of logical volumes is identified. Upon conveying the maximum size to a user, and receiving, from the user, a specified size less than or equal to the maximum size, the specified number of the volumes having the specified size can be provisioned, wherein each of the volumes is stored in a given storage pool.

17 Claims, 4 Drawing Sheets

DETERMINING MAXIMUM VOLUME SIZE

FIELD OF THE INVENTION

The present invention relates generally to logical volume management, and specifically to determining a maximum volume size for multiple volumes in a plurality of storage pools.

BACKGROUND

In computer storage systems, logical volume management can be used to manage physical storage devices such as hard disk drives. Logical volume management provides a method of allocating space on mass-storage devices that is more flexible than conventional partitioning schemes. In particular, a storage administrator can concatenate, stripe together or otherwise combine regions (a region is a sequence of bytes having a specific length, typically one megabyte) into larger virtual regions that administrators can re-size or move, potentially without interrupting system use.

Storage systems may comprise multiple storage pools, wherein each of the storage pools comprises a distinct set of storage regions (also known as blocks and partitions) on the storage system that the storage administrator can combine in order to define a logical volume. In some configurations, storage pools can be differentiated by one or more services that they provide. Examples of the services provided by storage pools include, but are not limited to, encryption, compression, thick provisioning and thin provisioning.

The description above is presented as a general overview of related art in this field and should not be construed as an admission that any of the information it contains constitutes prior art against the present patent application.

SUMMARY

There is provided, in accordance with an embodiment of the present invention a method, including receiving a request including a specified number of logical volumes, identifying, in a storage system including multiple storage pools having storage space, respective first amounts of the storage space that are available in the multiple storage pools, defining, based on the specified number of logical volumes and the first amounts of the storage space, a set of volume sizes indicating second amounts of the storage space, and identifying a given volume size indicating a maximum size for the specified number of logical volumes.

There is also provided, in accordance with an embodiment of the present invention an apparatus, a storage system including one or more storage pools having storage space, and a computer coupled to the storage system and configured to receive a request including a specified number of logical volumes, to identify, in the storage system, respective first amounts of the storage space that are available in the multiple storage pools, to define, based on the specified number of logical volumes and the first amounts of the storage space, a set of volume sizes indicating second amounts of the storage space, and to identify a given volume size indicating a maximum size for the specified number of logical volumes.

There is further provided, in accordance with an embodiment of the present invention a computer program product, the computer program product including a non-transitory computer readable storage medium having computer readable program code embodied therewith, the computer readable program code including computer readable program code configured to receive a request including a specified number of logical volumes, computer readable program code configured to identify, in a storage system including multiple storage pools having storage space, respective first amounts of the storage space that are available in the multiple storage pools, computer readable program code configured to define, based on the specified number of logical volumes and the first amounts of the storage space, a set of volume sizes indicating second amounts of the storage space, and computer readable program code configured to identify a given volume size indicating a maximum size for the specified number of logical volumes.

BRIEF DESCRIPTION OF THE DRAWINGS

The disclosure is herein described, by way of example only, with reference to the accompanying drawings, wherein.

DETAILED DESCRIPTION OF EMBODIMENTS

When managing a computer storage system, a storage administrator may want to provision a fixed number of same-size logical volumes in a specified storage service. The storage service typically contains multiple storage pools, and assuming that a given logical volume resides in a single storage pool, the storage administrator may want to know a maximal volume size available for the provisioned volumes.

Embodiments of the present invention provide methods and systems for determining a maximum volume size for multiple volumes to be provisioned in a storage system comprising multiple storage pools. As described hereinbelow, upon receiving a request comprising a specified number of logical volumes, respective available first amounts of storage space in multiple storage pools of a storage system are identified. Based on the specified number of logical volumes and the first amounts of the storage space, a set of volume sizes indicating second amounts of the storage space are defined, and a given volume size is identified that indicates a maximum size for the specified number of logical volumes.

Figure 1:
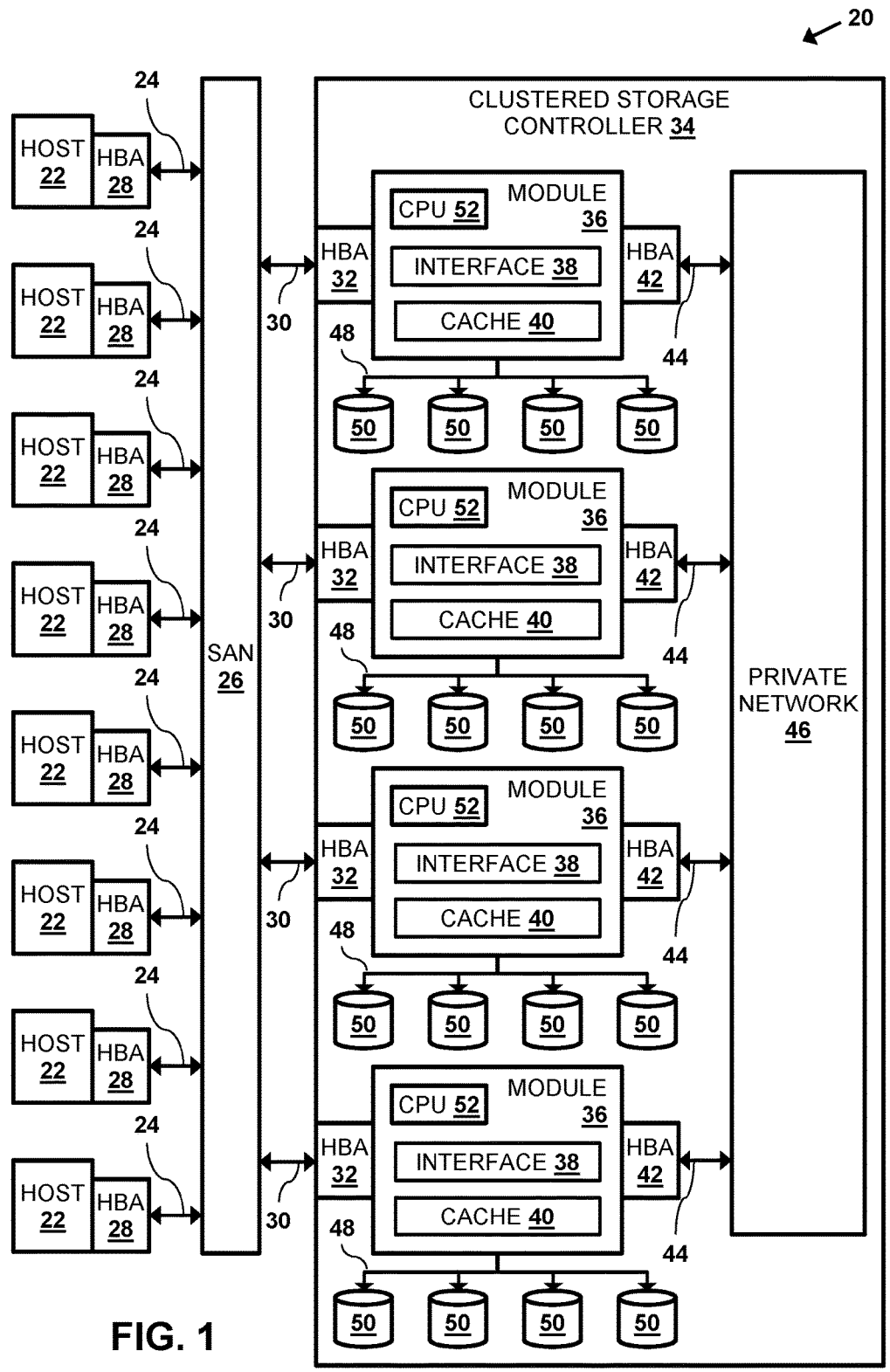
FIG. 1 is a block diagram that schematically illustrates a storage system comprising a storage controller, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 40 (in communication between adapters 32 and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller comprising any multiple of modules 36 coupled to any plurality of storage devices 50 is considered to be with the spirit and scope of the present invention.

Figure 2:
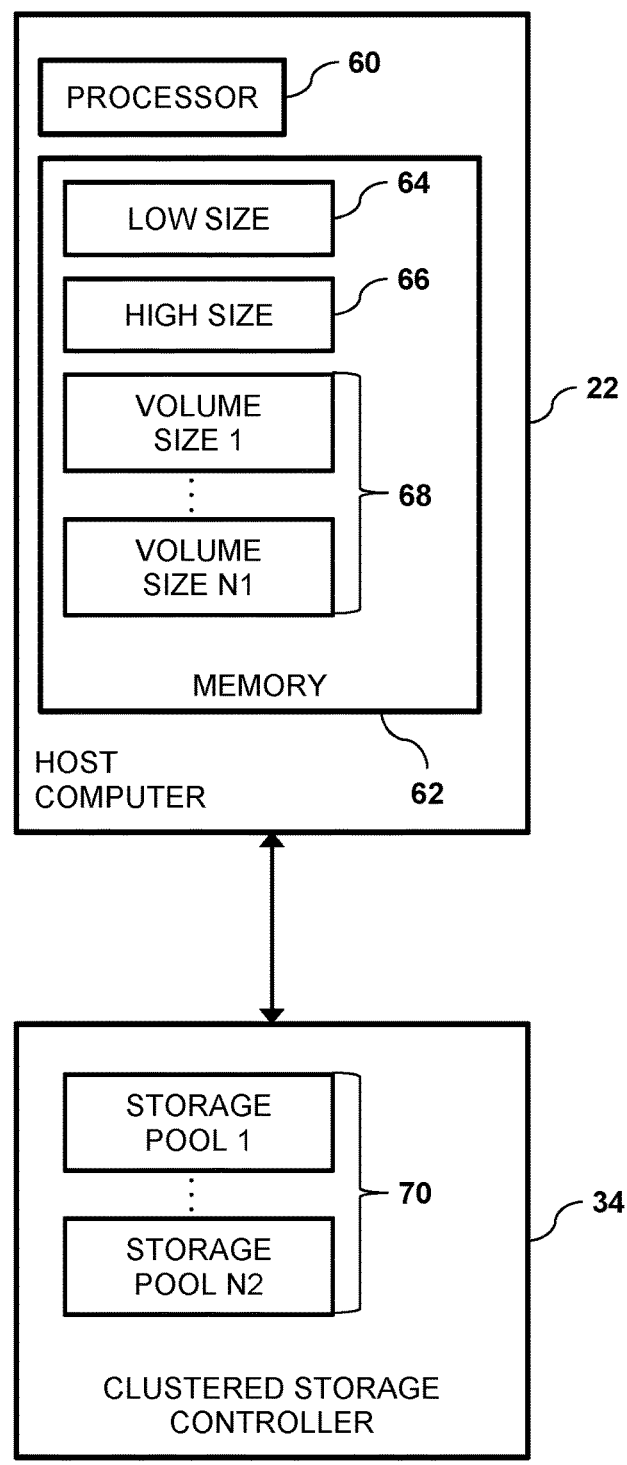
FIG. 2 is a block diagram that schematically illustrates configuration of a host computer configured to determine a maximum volume size for multiple volumes to be provisioned in a plurality of storage pools on the storage controller, in accordance with an embodiment of the present invention.

FIG. 2 is a block diagram that schematically illustrates configuration of a given host computer 22 configured to determine a maximum volume size for multiple volumes to be provisioned in storage controller 34, in accordance with an embodiment of the present invention. The given host computer is coupled (e.g., via a network connection) to storage controller 34 and comprises a host processor 60, and a host memory 62 that stores a low size 64, a high size 66 and a set of volume sizes 68. Low size 64, high size 66 and volume sizes 68 are described in the description referencing FIG. 3 hereinbelow.

In operation, storage controller 34 manages storage pools 70 that are physically stored on storage devices 50. In some embodiments, each storage pool 70 may comprise one or more storage services such as compression and encryption.

While for purposes of simplicity, the configuration in FIG. 2 shows storage pools 70 (and any logical volumes provisioned in the storage pools) coupled to a single given host 22, other configurations for the storage pools (and therefore the logical volumes) are considered to be within the spirit and scope of the present invention. In one configuration, a given storage pool 70 may be coupled to multiple host computers 22. In another configuration, a given storage pool 70 may not be coupled to any host computer 22. For example, one or more given storage pools may be used by a given storage controller 34 (or by any storage system) as a backup, and therefore not coupled to any host computer 22. In configurations where a given storage pool 70 is not be coupled to any host computer 22, embodiments described herein (i.e., operations performed by a given processor 60) can be performed by a given processor 52 (i.e., directly by a storage system).

Additionally, while FIG. 2 shows the given host computer configured to determine a maximum volume size for multiple logical volumes to be provisioned in a given storage pool 70 on storage controller, configuring host computer 22 to determine the maximum volume size for multiple logical volumes to be provisioned in multiple storage pools 70 on any type of storage system is considered to be within the spirit and scope of the present invention. For example, storage pools 70 can be deployed in one or more physical storage systems, or can be deployed in a software defined storage (SDS) system.

Processors 52 and 60 comprise general-purpose central processing units (CPU) or special-purpose embedded processors, which are programmed in software or firmware to carry out the functions described herein. The software may be downloaded to modules 36 and host computers 22 in electronic form, over a network, for example, or it may be provided on non-transitory tangible media, such as optical, magnetic or electronic memory media. Alternatively, some or all of the functions of processors 52 and 60 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Maximum Volume Size Calculation

Figure 3:
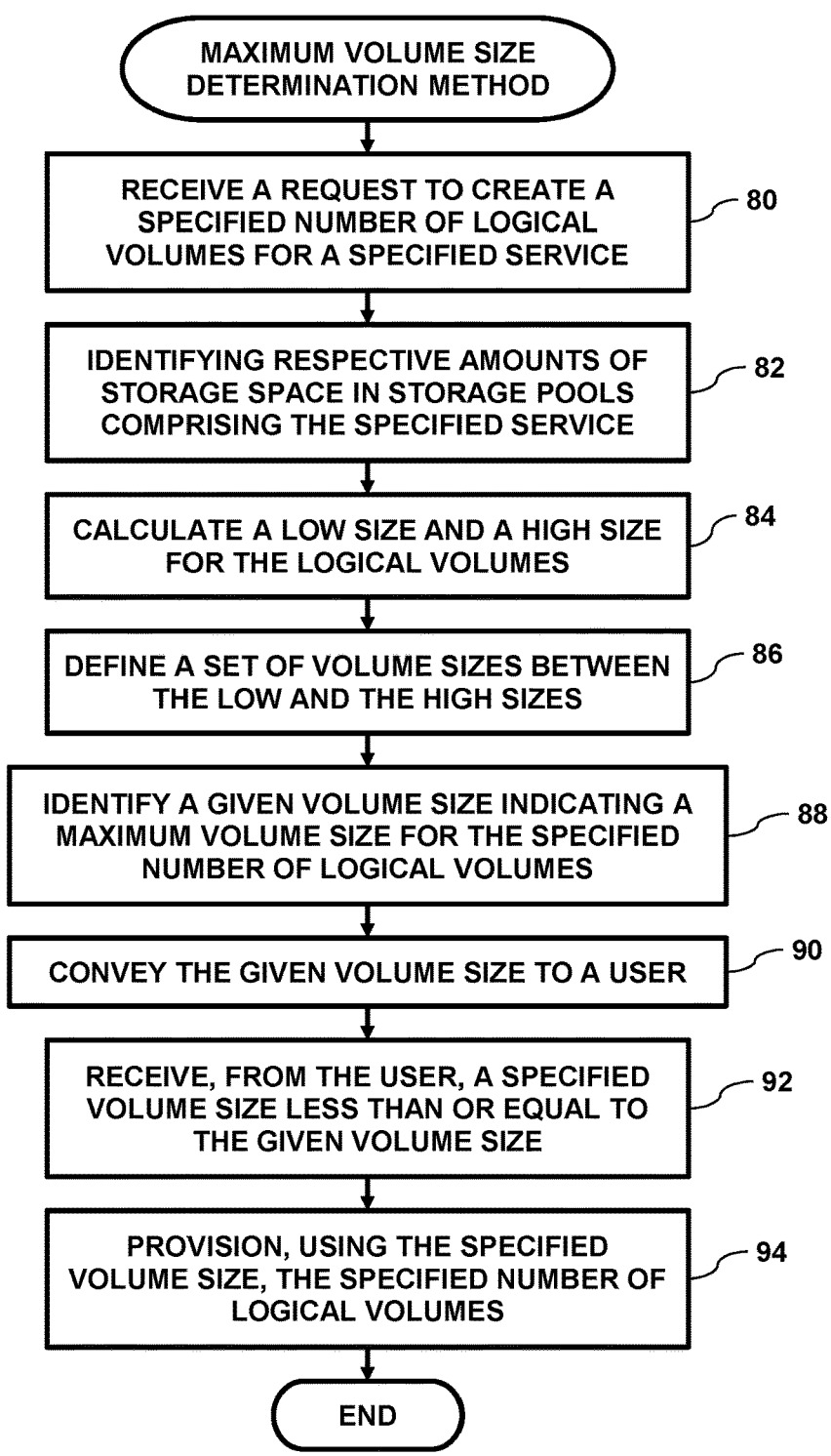
FIG. 3 is a flow diagram that schematically illustrates a method of determining the maximum volume size for multiple logical volumes to be provisioned in the storage pools, in accordance with an embodiment of the preset invention.
Figure 4:
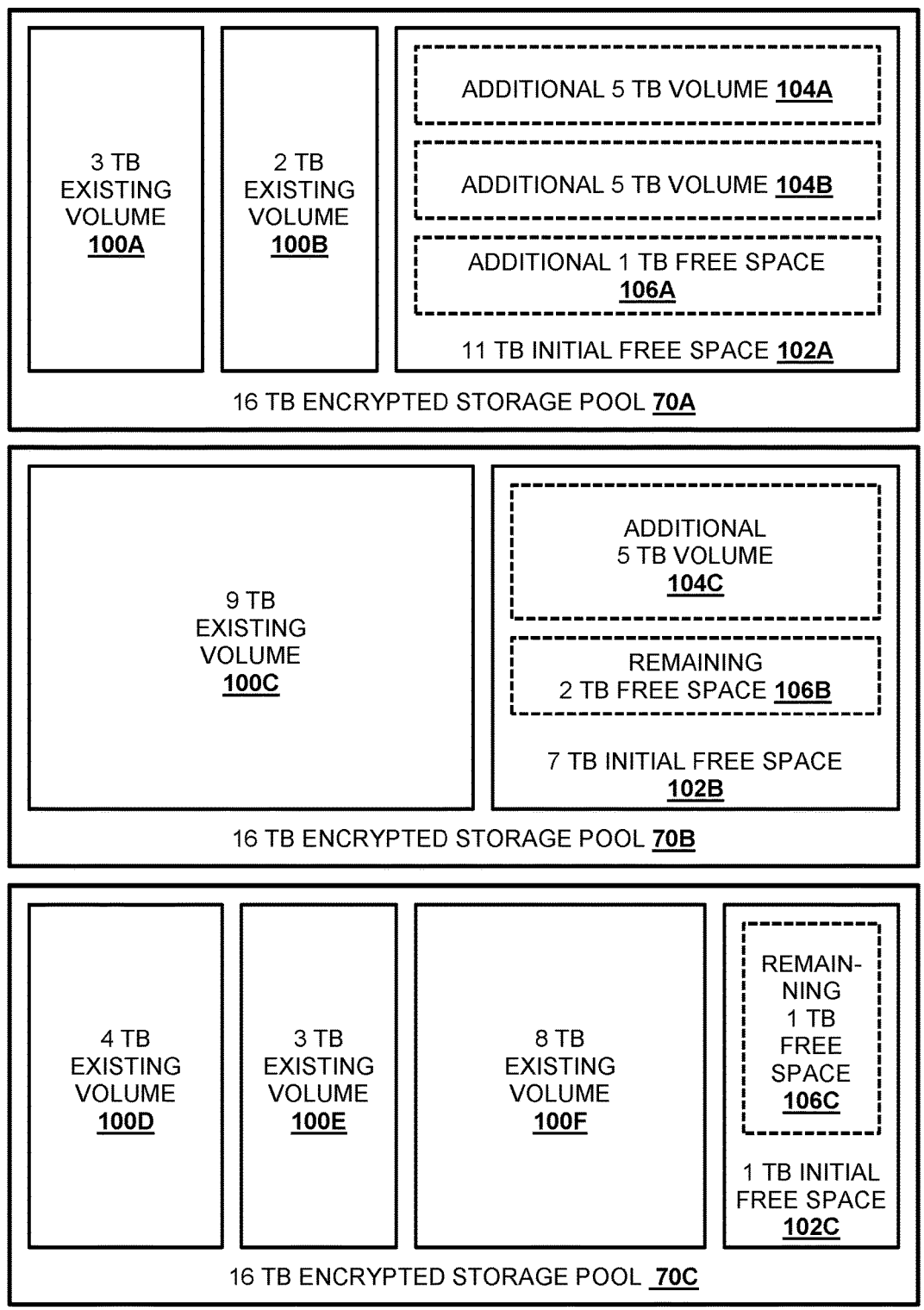
FIG. 4 is a block diagram that schematically illustrates the logical volumes provisioned in the storage pools, in accordance with an embodiment of the preset invention.

FIG. 3 is a flow diagram that schematically illustrates a method of calculating a maximum volume size for multiple logical volumes 100 provisioned in multiple storage pools 70, and FIG. 4 is a block diagram that schematically illustrates the distribution of the logical volumes in the storage pools, in accordance with an embodiment of the present invention. Each storage pool 70 comprises one or more existing logical volumes 100, initial free storage space 102, zero or more additional logical volumes 104, and remaining free storage space 106.

In embodiments described herein, initial free storage spaces 102 and the storage space indicated by volume sizes 68 may comprise physical storage space and/or logical storage space. Additionally, each of the existing and the additional logical volumes are stored in a single storage pool 70. In other words a given volume 100 or 104 cannot span two or more storage pools 70. Furthermore, initial free storage spaces 102 may also be referred to herein as first amount of storage space, and the storage space indicated by volume sizes 68 may also be referred to as second amounts of storage space.

In FIG. 4, storage pools 70 comprise encrypted (i.e., a storage service) 16 terabyte (TB) storage pools that are differentiated by appending a letter to the identifying numeral, so that the storage pools comprise storage pools 70A-70B. Additionally, existing logical volumes 100, initial free storage spaces 102, additional logical volumes 104 and remaining free storage spaces 106 are differentiated by appending a letter to the identifying numeral, so that the existing logical volumes comprise existing logical volumes 100A-100E, initial free storage spaces 102 comprise initial free storage spaces 102A-102B, additional logical volumes 104 comprise additional logical volumes 104A-104C, and remaining free storage spaces 106 comprise remaining free storage spaces 106A-106C.

As described in the example described in the flow diagram shown in FIG. 3:

Storage pool 70A comprises existing logical volumes 100A-100B, and initial free storage space 102A that comprises additional logical volumes 104A-104B and remaining free storage space 106A.

Storage pool 70B comprises existing logical volume 100C, and initial free storage space 102B that comprises additional logical volume 104C and remaining free storage space 106B.

Storage pool 70C comprises existing logical volumes 100D-100F, and initial free storage space 102C that is in accordance with remaining free storage space 106C.

In a first receive step 80, processor 60 receives (e.g., via a user input), from a storage administrator, a request to create a specified number of additional logical volumes 104 in storage pools 70 having one or more specified storage services. In the example shown in FIG. 4, the request is for three additional logical volumes 104 in storage pools 70 having an encryption service.

In a first identification step 82, processor 60 identifies initial free spaces in each storage pool 70 having the requested service. In the example shown in FIG. 4:

16 TB encrypted storage pool 70A comprises 3 TB existing logical volume 100A and 2 TB existing logical volume 100B. Therefore, initial free storage space 102A comprises 11 TB of storage space.

16 TB encrypted storage pool 70B comprises 9 TB existing logical volume 100C. Therefore, initial free storage space 102B comprises 7 TB of storage space.

16 TB encrypted storage pool 70C comprises 4 TB existing logical volume 100D. 3 TB existing logical volume 100E and 8 TB existing logical volume 100F. Therefore, initial free storage space 102B comprises 1 TB of storage space.

In a calculation step 84, processor 60 calculates respective values for low size 60 (also referred to herein as LowSize) and high size 66 (also referred to herein as HighSize). In embodiments described herein, to determine the maximum size for the specified number of additional logical volumes 104, processor 60 calculates low size 64 indicating a lower bound for the maximum size, and calculates high size 66 indicating an upper bound for the maximum size. The maximum size is typically limited by the maximum free space of a single given storage pool 70, and also limited by the total of initial free storage spaces 102 divided into the requested specified number of additional logical volumes 104.

For example, if the request is for N additional logical volumes 104, and there are X storage pools 70, each storage pool 70 j having $P_j$ indicating respective initial free storage spaces 102, processor 60 can use the formula $$\text{HighSize}=\text{minimum}(P_1,(\Sigma_j P_j)/N) \quad (1)$$

to calculate high size 66, wherein $P_1$ has the largest initial free storage space 102. That is, we assume that if j<z, then Pj>=Pz, and if not, processor 60 can sort the storage pools to achieve this assumption. Processor 60 can also use the formula $$\text{LowSize}=P_1/N \quad (2)$$

to calculate low size 64.

In a definition step 86, processor 60 defines set S of volume sizes 68, wherein each of the volume sizes is greater than or equal to low size 64 and less than or equal to high size 66. Possible volume sizes can be limited to S between the low size 64 and high size 66, and also belong to the sizes in set $$[Pi_{=i} \ldots, j=1 \ldots n] \quad (3)$$

In other words, for each given initial free storage space 102, processor 60 can calculate the given initial free space divided by 1, 2 . . . n where n is the number of additional logical volumes 104 that are allocated. In operation, each volume size 68 in the set S which is not within the low size and the high size limits is discarded.

The number of volume sizes 68 can be limited by $$(n*(n-1)/2) \quad (4)$$

since at most for each pool $P_j$, processor 60 can identify storage space for (n−j) additional logical volumes 10 (i.e., all j additional logical volumes 104 before storing any of the additional logical volumes, with at least one additional logical volume 105 per storage pool 70 having larger space). In some embodiments, the number of volume sizes can also be reduced per storage system, based on factors such as volume size limitations of the storage system, low size 64, high size 66, and volume size multiplications.

In a second identification step 88, processor 60 identifies a given volume size 68 that indicates a maximum volume size for the requested number of additional logical volumes 104, given initial free storage spaces 102 in storage pools 70. The placement method can be based on a strategy selected by the user and finds the maximum volume size with no other limitations. For example, processor 60 can perform a binary search for the maximum volume size, starting from low size 64 a minimum border and high size 66 as a maximum border, and use the calculated set S of possible volume sizes 68.

The goal of search strategies (e.g., binary searches, sequential searches etc.) is to find a maximum size S can be fulfilled for N volumes in storage pools 70 having free space $P_1 \ldots P_x$ (i.e., initial free storage spaces 102). To determine if a given volume size 68 can be used to store the requested number of additional logical volumes 104 in storage pools 70, processor 60 can use an algorithm such as:

```
Num_of_placed = 0;
Current_pool = 0;
While (num_of_placed < N) & current_pool < X :
    Current_pool += 1;
    Can_be_placed = int(Pcurrent_pool / S)
    If can_be_placed == 0, return false
    Num_of_placed += can_be_placed
Return true
```

In a convey step 90, processor 60 conveys the maximum volume size to the storage administrator (i.e., a user), and in a second receive step 92, the processor receives, from the user (i.e., in response to the conveyed maximum volume size), a specified volume size less than or equal to the maximum volume size. Finally, in a provisioning step 94, processor 60 provisions, using the specified volume sizes, the requested number of additional logical volumes in storage pools 70, and the method ends.

In the example shown in FIG. 4, the maximum volume size for three volumes in pools is 5.5 TB, which would leave no free space in storage pool 70A and 1 TB free in storage pool 70B. Since initial free space 106C comprises 1 TB of storage space, there is not enough room in storage pool 70C to provision any additional volumes 104 having a size of more than 1 TB. As shown in FIG. 4, the storage administrator chose a size of 5 TB for additional logical volumes 104A-104C, thereby leaving 1 TB in remaining free storage space 106A and 2 TB in remaining free storage space 106B.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for managing storage volumes in a storage system, by a processor, comprising:
   receiving a request from a user to create a specified number of logical volumes;
   identifying, in the storage system comprising multiple storage pools having storage space, respective first amounts of the storage space comprising initial free storage space within the multiple storage pools prior to the creation of the specified number of logical volumes that are available in the multiple storage pools; wherein the multiple storage pools each comprise a plurality of storage devices and the specified number of logical volumes are created within ones of the plurality of storage devices of the multiple storage pools;
   defining, based on the specified number of logical volumes and the first amounts of the storage space, a set of volume sizes indicating second amounts of the storage space comprising remaining free storage space within the multiple storage pools subsequent to the creation of the specified number of logical volumes; wherein defining the set of the volume sizes comprises defining a low size and a high size, and wherein each of the volume sizes in the set is greater than or equal to the low size and less than or equal to the high size; and wherein each volume size not within a bound of the low size and the high size is discarded; and
   identifying a given volume size of the set of volume sizes indicating a maximum size for the specified number of logical volumes.

2. The method according to claim 1, wherein the storage system is a software defined storage system.

3. The method according to claim 1, wherein the storage space is selected from a group consisting of physical storage space and logical storage space.

4. The method according to claim 1, wherein the storage system provides a plurality of storage services, wherein the multiple storage pools are associated with a given storage service, and wherein the request indicates the given storage service.

5. The method according to claim 1, and comprising conveying the maximum size to the user.

6. The method according to claim 5, and comprising receiving, from the user, a specified size less than or equal to the conveyed maximum size, and provisioning, using the specified size, the specified number of the logical volumes, wherein each of the logical volumes is stored in a given storage pool.

7. An apparatus, comprising:
   a storage system comprising one or more storage pools having storage space; and
   a computer coupled to the storage system and configured:
   to receive a request from a user to create a specified number of logical volumes, to identify, in the storage system, respective first amounts of the storage space comprising initial free storage space within the multiple storage pools prior to the creation of the specified number of logical volumes that are available in the multiple storage pools, wherein the multiple storage pools each comprise a plurality of storage devices and the specified number of logical volumes are created within ones of the plurality of storage devices of the multiple storage pools, to define, based on the specified number of logical volumes and the first amounts of the storage space, a set of volume sizes indicating second amounts of the storage space comprising remaining free storage space within the multiple storage pools subsequent to the creation of the specified number of logical volumes; wherein defining the set of the volume sizes comprises defining a low size and a high size, and wherein each of the volume sizes in the set is greater than or equal to the low size and less than or equal to the high size; and wherein each volume size not within a bound of the low size and the high size is discarded, and to identify a given volume size of the set of volume sizes indicating a maximum size for the specified number of logical volumes.

8. The apparatus according to claim 7, wherein the storage system is a software defined storage system.

9. The apparatus according to claim 7, wherein the storage space is selected from a group consisting of physical storage space and logical storage space.

10. The apparatus according to claim 7, wherein the storage system provides a plurality of storage services, wherein the multiple storage pools are associated with a given storage service, and wherein the request indicates the given storage service.

11. The apparatus according to claim 7, wherein the computer is configured to convey the maximum size to the user.

12. The apparatus according to claim 11, wherein the computer is configured to receive, from the user, a specified size less than or equal to the conveyed maximum size, and to provision, using the specified size, the specified number of the logical volumes, wherein each of the logical volumes is stored in a given storage pool.

13. A computer program product for managing storage volumes in a storage system, by a processor, the computer program product comprising:

a non-transitory computer readable storage medium having computer readable program code embodied therewith, the computer readable program code comprising:

computer readable program code configured to receive a request from a user to create a specified number of logical volumes;

computer readable program code configured to identify, in the storage system comprising multiple storage pools having storage space, respective first amounts of the storage space comprising initial free storage space within the multiple storage pools prior to the creation of the specified number of logical volumes that are available in the multiple storage pools; wherein the multiple storage pools each comprise a plurality of storage devices and the specified number of logical volumes are created within ones of the plurality of storage devices of the multiple storage pools;

computer readable program code configured to define, based on the specified number of logical volumes and the first amounts of the storage space, a set of volume sizes indicating second amounts of the storage space comprising remaining free storage space within the multiple storage pools subsequent to the creation of the specified number of logical volumes; wherein defining the set of the volume sizes comprises defining a low size and a high size, and wherein each of the volume sizes in the set is greater than or equal to the low size and less than or equal to the high size; and wherein each volume size not within a bound of the low size and the high size is discarded; and computer readable program code configured to identify a given volume size of the set of volume sizes indicating a maximum size for the specified number of logical volumes.

14. The computer program product according to claim 13, wherein the storage system is a software defined storage system.

15. The computer program product according to claim 13, wherein the storage space is selected from a group consisting of physical storage space and logical storage space.

16. The computer program product according to claim 13, wherein the storage system provides a plurality of storage services, wherein the multiple storage pools are associated with a given storage service, and wherein the request indicates the given storage service.

17. The computer program product according to claim 13, and comprising computer readable program code configured to convey the maximum size to the user.

* * * * *